United States Patent
Lasher

[15] 3,691,839
[45] Sept. 19, 1972

[54] PORTABLE FLUID GAUGE
[72] Inventor: George D. Lasher, 858 Carmen, Fresno, Calif. 94538
[22] Filed: Sept. 10, 1970
[21] Appl. No.: 70,999

[52] U.S. Cl. ............73/322, 73/323, 116/118 R, 285/4
[51] Int. Cl. ............G01f 23/06, F16l 47/00
[58] Field of Search........73/322, 314, 319, 294, 323, 73/306, 421 R; 285/4; 220/24 B, 27; 116/118 R

[56] References Cited

UNITED STATES PATENTS

| | | | |
|---|---|---|---|
| 2,565,423 | 8/1951 | Evans | 73/322 |
| 3,498,141 | 3/1970 | Nelson et al. | 73/319 |
| 986,535 | 3/1911 | Adams | 73/294 |
| 3,359,799 | 12/1967 | Lubin | 73/322 |
| 2,772,568 | 12/1956 | Samaritano | 73/322 |
| 1,258,884 | 3/1918 | Fife | 285/4 |

FOREIGN PATENTS OR APPLICATIONS 120,414  11/1918  Great Britain..............73/322

Primary Examiner—Louis R. Prince
Assistant Examiner—Daniel M. Yasich
Attorney—Huebner & Worrel

[57] ABSTRACT

A portable gauge for measuring the fluid contents of a container having an opening circumscribed by a substantially horizontal wall portion, said gauge having a base adapted to rest on said wall portion, a transparent tubular float extended through the base for free elevational movement with respect thereto, and a scale extended longitudinally of the float adjacent to the base for visual comparison therewith, the scale being calibrated in terms of the volumetric contents of the container at various fluid levels therein.

1 Claim, 3 Drawing Figures

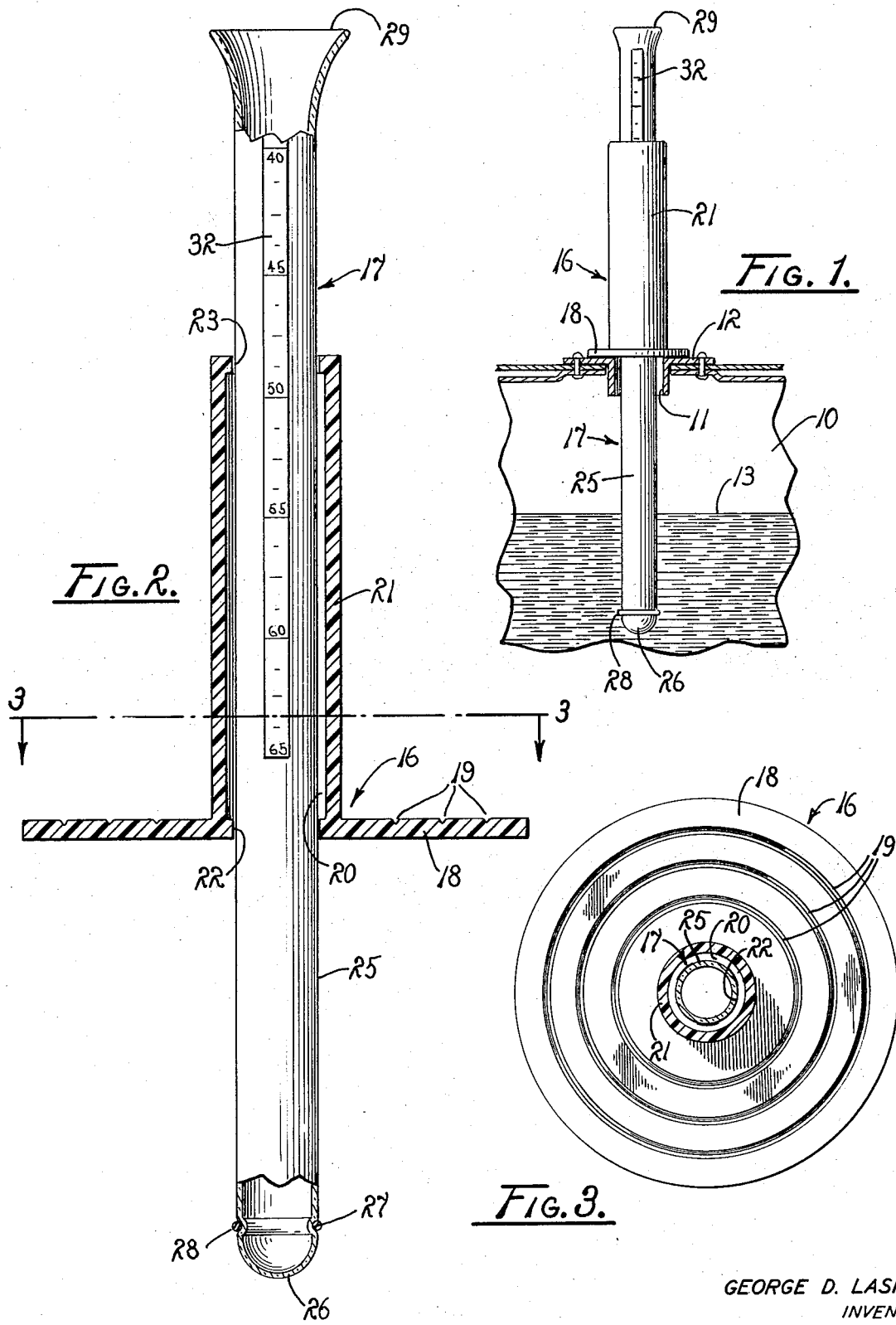
GEORGE D. LASHER
INVENTOR
Huebner & Worrel
ATTORNEYS 3,691,839

PORTABLE FLUID GAUGE

BACKGROUND OF THE DISCLOSURE

The present invention relates to a portable fluid gauge and more particularly to such a gauge which can be conveniently and easily utilized for measuring the fluid contents of a container.

The invention resulted from the solution to certain problems associated with private aviation and can be conveniently illustrated in connection with such utilization. The fuel gauges of private airplanes are notoriously unreliable. Thus, every preflight check of such an airplane should involve the accurate determination of the amount of fuel aboard the plane. The usual practice is to remove the cap from the filler opening of each tank and by visual inspection to determine the fuel level therein. If the plane is a high-wing plane, it is usually necessary to employ a ladder in order to get access to the cap and filler opening and to observe the fuel level. If the plane is a low-wing plane, access to the cap and filler opening is somewhat more easily attained but unless the tank is full, visual inspection is only a rough guide to an estimate of the total fuel in the tank. Of the pilot endeavors to make a more accurate determination by inserting a stick into the tank, the hazards of contaminating the fuel and lodging bits of the stick in the tank are present. Even with the utilization of such a stick, it nevertheless normally is necessary for the pilot to estimate the fuel available.

OBJECTS AND SUMMARY OF THE INVENTION

In view of the foregoing, an object of the present invention is to provide an improved portable fluid gauge.

Another object is to provide such a gauge which is simply and easily utilized accurately to measure the fluid contents of a container.

Another object is to provide a portable gauge, for measuring the fluid contents of a container having an opening circumscribed by a substantially horizontal surface, which can be directly read to determine the fluid contents of the container by simply resting a portion of the gauge on the horizontal surface with a float portion of the gauge extended into the container and supported by the fluid therein.

Another object is to enable private pilots conveniently and easily to pre-flight their fuel tanks.

Another object is to provide an improved portable gauge that is economical, accurate, easily modified to accommodate various containers, such as fuel tanks and the like, and which avoids the hazards of contaminating the fluid contents of containers when measuring the amounts thereof remaining in the containers.

Another object is to provide a gauge of the character described which is adapted to contain specimens of such fluids for visual inspection.

Further objects and advantages will become apparent in the subsequent description in the specification.

BRIEF DESCRIPTION OF THE DRAWINGS

FIG. 1 is a fragmentary vertical section of a fluid container having a portable gauge of the present invention shown in side elevation positioned within the container as utilized in measuring the contents of the fluid therein.

FIG. 2 is a somewhat enlarged side elevation of the gauge of FIG. 1 with a base member thereof illustrated in vertical section and with a portion of the lower end of the gauge broken away for illustrative convenience.

FIG. 3 is a section taken on line 3—3 of FIG. 2.

DESCRIPTION OF THE PREFERRED EMBODIMENT

Referring first to FIG. 1, a fluid container or fuel tank 10 is shown having a filler opening 11 in the top thereof circumscribed by an annular substantially horizontal flat wall portion 12. The filler opening 11 is normally closed by a cap, not shown. The container is shown as partially filled with fuel or other fluid having an upper lever 13.

Essentially, the gauge of the present invention consists of a base member 16 having a float 17 supported erectly therein for free floating movement with respect to the base member. The base member is of integral construction of plastic or the like and provides a flat annular flange 18 adapted to rest on the horizontal surface 12 of the tank 10. The flange is preferably provided with concentric circular indentations 19 which form weakened lines of breakage so that annular portions of the flange can be broken away, if desired, in order to reduce the diameter of the flange sufficiently to be accommodated by the annular surface 12. The flange has a concentric opening 20 and a sleeve 21 is extended concentrically upwardly therefrom integrally with the flange. The opening 20 is circumscribed by a bearing surface 22 and a similar annular bearing surface 23 is provided at the upper end of the sleeve.

The float 17 has the general appearance of a chemical test tube and is preferably formed of glass or any suitable plastic material. It provides an elongated substantially cylindrical central portion 25 which is slidably fitted to the bearing surfaces 22 and 23. The float provides a closed lower end 26 and a circumscribing indentation 27 just above the lower end which receives a ring 28 constricted thereabout. The ring is of sufficient external diameter that it cannot pass through the bearing surface 22 and thus upward movement of the float relative to the base member is limited. The float is preferably transparent and has a funnel-shaped upper end 29 so that fuel or the like can be poured into the float and visually examined through the walls thereof to discover contaminants which may be visually apparent. A scale 32 is provided longitudinally of the float in a position for visual comparison of the graduations of the scale with the upper end of the sleeve 21. The scale is preferably calibrated to make direct reading of the volumetric fluid contents of the tank 10 directly readable. The upper end of the float is of a sufficient diameter to preclude downward movement of the float from the base member, thus, the float is permanently associated with the base member unless the ring 28 is removed.

OPERATION

The operation of the gauge of the present invention is believed to be clearly apparent and is briefly summarized at this point. In order to determine the volumetric contents of the fluid in the tank 10, the flange 18 of the gauge is rested downwardly on the annular flat portion 12. If initially the flange is of too great a diameter properly to rest on such flat portion, the diameter can conveniently be reduced by breaking away outer portions of the flange along a selected indentation 19.

With the base member 16 so disposed, the float 17 descends into the tank 10 until the lower end 26 reaches the fluid 13 and is buoyantly supported thereon. When the float has come to rest, the fluid contents of the tank can be directly read from the scale 32. It will be appreciated that this can be speedily and easily accomplished.

It is frequently desirable to make visual inspection of aircraft fuel and other fluids to determine if contaminants, such as water or debris, are present. This can easily be accomplished with the gauge of the present invention. For example, if it is the fuel of an aircraft which is to be examined, fuel is drained from the sump of the tank into the funnel-shaped upper end 29 of the float 17. It is then permitted to settle for a moment after which visual inspection can readily determine whether water, debris, or other contaminants are present.

The gauge of the present invention is economical to construct, quickly and easily utilized in determining the fluid contents of a container, obviates the hazards of contaminating such fluid while measuring their extent and makes the direct reading of a fluid level in a container accurately and positively available. It has made possible the quick and accurate pre-flight checking of the fuel aboard light aircraft. It can readily be produced in a lightweight and compact embodiment for convenient carrying by such aircraft or the pilots thereof. It is conveniently employed to make visual inspection of fuel and other fluids which it is feared may contain contaminants.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A gauge for measuring the fluid contents of a container having a filler opening circumscribed by a substantially horizontal portion of the container comprising a base member having an annular flange adapted to rest on said portion of the container, the flange having a plurality of concentric circles intended therein to provide weakened breakable lines whereby the flange can be selectively sized to conform to said portion of the container, an elongated float slidably extended through the base adapted to float on the contents of the container, and a scale borne by the float readable in reference to the base member to reveal the fluid level in the container, the base member providing a tubular portion with which the float is telescopically associated, and the float being a transparent tube having an open upper end and a closed lower end useable for visually inspecting samples of the fluid deposited therein.

* * * * *